(12) United States Patent
Gupta (10) Patent No.: US 8,276,664 B2
(45) Date of Patent: Oct. 2, 2012

(54) WELL TREATMENT OPERATIONS USING SPHERICAL CELLULOSIC PARTICULATES

(75) Inventor: D. V. Satyanarayana Gupta, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/191,255

(22) Filed: Aug. 13, 2008

(65) Prior Publication Data

US 2009/0044942 A1 Feb. 19, 2009

Related U.S. Application Data

(60) Provisional application No. 60/964,472, filed on Aug. 13, 2007.

(51) Int. Cl.
E21B 43/267 (2006.01)

(52) U.S. Cl. .................. 166/280.2; 166/278; 166/308.3; 507/214

(58) Field of Classification Search ........................ None
See application file for complete search history.

(56) References Cited

U.S. PATENT DOCUMENTS

| | | | |
|---|---|---|---|
| 4,741,401 A | 5/1988 | Walles et al. | |
| 5,261,491 A | 11/1993 | Stewart et al. | |
| 5,439,055 A | 8/1995 | Card et al. | |
| 6,059,034 A | 5/2000 | Rickards et al. | |
| 6,248,838 B1 | 6/2001 | Albright | |
| 6,330,916 B1 | 12/2001 | Rickards et al. | |
| 6,350,721 B1 | 2/2002 | Fu et al. | |
| 6,364,018 B1 | 4/2002 | Brannon et al. | |
| 6,451,953 B1 | 9/2002 | Albright | |
| 6,508,305 B1 | 1/2003 | Brannon et al. | |
| 6,608,005 B2 | 8/2003 | Palmer et al. | |
| 6,749,025 B1 | 6/2004 | Brannon et al. | |
| 6,772,838 B2 | 8/2004 | Dawson et al. | |
| 6,808,557 B2 | 10/2004 | Holbrey et al. | |
| 6,824,599 B2 | 11/2004 | Swatloski et al. | |
| 7,207,386 B2 | 4/2007 | Brannon et al. | |
| 7,210,528 B1 | 5/2007 | Brannon et al. | |
| 7,322,411 B2 | 1/2008 | Brannon et al. | |
| 2004/0040708 A1 | 3/2004 | Stephenson et al. | |
| 2005/0028979 A1 | 2/2005 | Brannon et al. | |
| 2005/0065020 A1 | 3/2005 | Holbrey et al. | |
| 2005/0274617 A1 | 12/2005 | Bryning | |
| 2005/0288484 A1 | 12/2005 | Holbrey et al. | |
| 2006/0047027 A1 | 3/2006 | Brannon et al. | |
| 2006/0065396 A1 | 3/2006 | Dawson et al. | |
| 2006/0065398 A1 | 3/2006 | Brannon et al. | |
| 2006/0073980 A1 | 4/2006 | Brannon et al. | |
| 2006/0078682 A1 | 4/2006 | McDaniel et al. | |
| 2006/0124301 A1 | 6/2006 | Gupta et al. | |
| 2006/0124302 A1 | 6/2006 | Gupta et al. | |
| 2006/0147532 A1 | 7/2006 | Ausborn et al. | |
| 2006/0177661 A1* | 8/2006 | Smith et al. .................. | 428/403 |
| 2006/0251961 A1 | 11/2006 | Olbert et al. | |
| 2006/0254826 A1* | 11/2006 | Alberthy ......................... | 175/72 |
| 2006/0258546 A1 | 11/2006 | Brannon et al. | |
| 2006/0269695 A1 | 11/2006 | Daly et al. | |
| 2007/0066491 A1 | 3/2007 | Bicerano et al. | |
| 2007/0161515 A1 | 7/2007 | Bicerano | |
| 2007/0181302 A1 | 8/2007 | Bicerano | |

FOREIGN PATENT DOCUMENTS

WO WO 2006/111712 A2 10/2006

OTHER PUBLICATIONS

"Putting Science to Work", I&EC Newsletter; Jul. 6, 2005, pp. 1-13, Summer-Fall 2005, The American Chemical Society Division of Industrial & Engineering, USA.
American Chemical Society Symposium on Microencapsulation: Processes and Applications, & Vandegaer, J. E., "Microencapsulation: processes and applications", Symposium, Aug. 1973, pp. 115-143, Plenum Press, New York, USA.
Darin, S.R. & Huitt, J. I., "Effect of a Partial Monolayer of Propping Agent on Fracture Flow Capacity", AIME—Petroleum Transactions SPE 1291-G, Oct. 1959, pp. 31-37, vol. 219-1960, Society of Petroleum Engineers, USA.
Fitzwater, Graham et al., "Ionic Liquids: Sources of Innovation", Report Q002, Jan. 2005, Quill, Belfast.
Ritter, Stephen K. "Green Success", Chemical & Engineering News, Jun. 2005, pp. 40-43, vol. 83-No. 26, American Chemical Society, USA.
Rosen, M. J., & Dahanayake, M., "Industrial Utilization of Surfactants: Principles and Practice", 2000, pp. 35-55, AOCS Press, Champaign, Illinois.
Short, Patricia L. "Out of the Ivory Tower", Chemical & Engineering News, Apr. 2006, pp. 15-21, vol. 84-No. 17, American Chemical Society, USA.

* cited by examiner

*Primary Examiner* — Zakiya W Bates
(74) *Attorney, Agent, or Firm* — John Wilson Jones; Jones & Smith LLP (57) ABSTRACT

Spherical porous and non-porous cellulose particulates for use in sand control as well as stimulation procedures, may be prepared by first dissolving cellulosic materials (such as fibrous cellulose, wood pulp linters, cotton balls and/or paper), in the substantial absence of water or a nitrogen-containing base, in an ionic liquid. The solution is then combined with a cellulose-insoluble liquid to render the spherical particulates. The surface of the cellulosic particulates may be treated with a coating or penetrating layer.

23 Claims, 2 Drawing Sheets

WELL TREATMENT OPERATIONS USING SPHERICAL CELLULOSIC PARTICULATES

This application claims the benefit of U.S. patent application Ser. No. 60/964,472, filed on Aug. 13, 2007.

FIELD OF THE INVENTION

Methods and compositions useful for subterranean formation treatments, such as hydraulic fracturing and sand control, are disclosed. In particular, the disclosed method relates to the use of spherical porous cellulose particulates as well as non-porous cellulose particulates in sand control methods such as gravel packing, frac pack treatments, etc., as well as proppant material in hydraulic fracturing.

BACKGROUND OF THE INVENTION

Stimulation procedures often require the use of well treating materials having high compressive strength. In hydraulic fracturing, such materials must further be capable of enhancing the production of fluid and natural gas from low permeability formations.

In a typical hydraulic fracturing treatment, fracturing treatment fluid containing a solid proppant material is injected into the wellbore at high pressures. Once natural reservoir pressures are exceeded, the fluid induces fractures in the formation and proppant is deposited in the fracture, where it remains after the treatment is completed. The proppant material serves to hold the fracture open, thereby enhancing the ability of fluids to migrate from the formation to the wellbore through the fracture. Fractured well productivity depends on the ability of a fracture to conduct fluids from a formation to a wellbore. Since fracture conductivity is an important parameter in determining the degree of success of a hydraulic fracturing treatment, selection of a proppant is often critical.

Conventional proppants, such as sand and glass beads and bauxite, as well as resin-coated sands, intermediate strength ceramics and sintered bauxite, are characterized by a fairly high apparent specific gravity (ASG). For instance, the ASG for sand is about 2.65 and the ASG for sintered bauxite is 3.4. Proppant transport is often difficult with such proppants. Further, higher ASG proppants (greater than 2.65) often cause a reduction in propped fracture volume, based on equivalent mass of proppant, which, in turn, causes a reduction in fracture conductivity. The high ASG of such conventional proppants is known to be the controlling factor in the difficulties in proppant transport and reduced propped fracture volume.

More recently, ultra lightweight (ULW) materials have been used as proppants. ULW proppants are typically characterized by an ASG less than or equal to 2.45 and exhibit better deformability than conventional heavy proppants. ULW proppants, in addition to having lower ASG than conventional heavy proppants, typically exhibit sufficient strength to withstand the rigors of high temperatures and high stresses downhole. While offering excellent compressive strength, ULW proppants often soften and loose their compressive strength especially at high temperature and high pressure downhole conditions. Alternatives have therefore been sought.

It is desirable that such alternative materials, when used in a fracturing fluid containing water, salt brine or slickwater be capable of creating a partial monolayer of proppant in the fracture. In conventional sand packs, tightly held packs often are characterized by insufficient interconnected interstitial spaces between abutting particulates. Increased interstitial spaces between the particulates are typically desired in order to increase conductivity. This may be achieved by use of a partial monolayer fracture wherein reduced volume of proppant particulates in a fracture is created by the use of widely spaced proppant particulates. Increased fracture conductivity results since the produced fluids typically flow around the widely-spaced proppant particulates rather than through the interstitial spaces in a packed bed. The phenomena of partial monolayer fracturing has been discussed in the literature. See, for instance, Brannon et al, "Maximizing Fracture Conductivity with Partial Monolayers: Theoretical Curiosity or Highly Productive Reality" SPE 90698, presented at the SPE Annual Technical Conference and Exhibition, Houston, Sep. 26-29, 2004. Unfortunately, partial monolayer fracturing has been difficult to achieve with state-of-the-art proppants.

Improved well treating materials have also been sought for use in the prevention of sand grains and/or other formation fines from migrating into the wellbore. When such migration occurs, such grains and fines typically reduce the rate of hydrocarbon production from the well. In addition, such grains and fines can cause serious damage to well tubulars and to well surface equipment.

Gravel packs are often used to control migration of formation sands and/or fines in producing formations into the production tubing. In a gravel pack installation, gravel is placed between the screen and the formation sand and/or fines. The produced fluids enter the production tubing through the wire screen. The wire screen, typically positioned in an open hole or inside the well casing, has very narrow openings which are large enough to permit the flow of formation fluid but small enough to bridge the formation sands and/or fines from passage through the screen. A gravel pack, which typically consists of uniformly sized spherical particulates, is further packed around the exterior of a screening device. Such spherical particulates operate to trap, and thus prevent the further migration of, formation sand and/or fines which would otherwise be produced along with the formation fluid.

In order to be useful in gravel packing applications, such spherical particulates must exhibit high strength and be capable of functioning in low permeability formations. ULW well treating materials have been proposed for use in gravel packing applications to improve transport, placement, and packing efficiency. Concerns exist however that ULW materials do not demonstrate the chemical resistance properties required of particulates for use in gravel packing.

Alternative well treating materials have therefore been sought which exhibit high compressive strength and which may be used to improve packing efficiency, transport and placement of proppant in fracturing. It is further desired that such materials be useful in other oilfield treatment processes, such as sand control.

SUMMARY OF THE INVENTION

Spherical porous and non-porous cellulose particulates may be prepared by first admixing cellulose (in the substantial absence of water or a nitrogen-containing base) with an ionic liquid and then combining the resulting dissolved cellulose mixture with a cellulose-insoluble liquid. The resulting precipitate renders the spherical particulates.

In a preferred embodiment, the spherical particulates are used in sand control methods, including gravel packing, as well as stimulating procedures, such as hydraulic fracturing.

The cellulose particulates are preferably fibrous cellulose, wood pulp linters, cotton balls or paper.

At least a portion of the surface of the cellulose particulates may be treated with a coating or penetrating layer. Suitable coating layers are phenolic resins, phenol-formaldehyde resins, melamine-formaldehyde resins, polyurethanes, carbamate resins, epoxy resins, polyamides, polyethylenes, polystyrenes and a combination thereof. In a preferred embodiment, the apparent specific gravity (ASG) of the coated cellulose particulate is less then the ASG of the uncoated cellulose particulate.

The spherical particulate may also form a composite with one or more synthetic resins which are soluble in an ionic liquid. Suitable synthetic resins include polyacrylates, poly (meth)acrylates, polyacrylamides, polyvinyl alcohol, polyvinyl acetates, polyamides, polyesters, polyimideamides, polybenzoimide, aramides, polyimides, poly(N-vinylpyrrolidinone), polyurethanes, polysiloxanes, phenolic polymers, polysulfides, polystyrenes, polyacetal, polyolefins and polydienes.

A composite may further be composed of spherical porous or non-porous cellulose particulates and either a temperature stabilizer or a strengthening agent. Suitable temperature stabilizers and strengthening agents include minerals, clay, hematite, inorganic salts, kaolin, molybdenum disulfide, oil, alumina, hematite, aluminum flake, stainless steel, silicone, polytetrafluoroethylene, carbon black, carbon Buckminster fullerenes, carbon nano-tubes, polyhedral oligomeric silsesquioxane, metals, metallic oxides, phosphates, borates, calcium carbonate, calcium chloride, calcium bromide, barium sulfate and aluminum flakes. In a preferred embodiment, a strengthening agent is used with porous cellulose particulates such that strengthening becomes integrated into a core material composed of cellulose particulates and strengthening agent.

The spherical particulate may further be composed of a particulate having an ASG greater than or equal to 2.45, wherein at least a portion of the particulate is coated or treated with a cellulosic material. In such instances, the ASG of the coated or treated particulate is typically lower than the ASG of the particulate. The proppant particulate is preferably silica, sand, resin-coated sand, ceramic particles, synthetic organic particles, glass microspheres and sintered bauxite as well as mixtures thereof.

The spherical particulates may be prepared by first forming an admixture of cellulose and an ionic liquid. The admixture is preferably formed at a temperature in the range of $-10°$ C. to $100°$ C. The admixture is agitated until the cellulose is dissolved. The solution is either introduced to a cellulose-insoluble liquid or a cellulose-insoluble liquid is introduced to the solution. A precipitate forms. The spherical particulates are then recovered from the precipitate and may be further dried to remove any residual cellulose-insoluble liquid from the particulate. In a preferred embodiment, the cellulose-insoluble liquid is water.

The spherical particulate or bead may be introduced into a subterranean formation along with a fracturing or carrier fluid in order to stimulate the production of hydrocarbons in an oil or gas well. In a preferred embodiment, the spherical particulate, which functions as a proppant, is introduced into the well at concentrations sufficient to achieve a partial monolayer fracture.

The invention further relates to a sand control method for a wellbore penetrating a subterranean formation. In this method, a slurry of spherical particulates and a carrier fluid are introduced into the wellbore. A portion of the particulates are then placed adjacent the subterranean formation to form a fluid-permeable pack capable of reducing or substantially preventing the passage of formation sand and/or fines from the subterranean formation into the wellbore while, at the same time, allowing passage of formation fluids from the subterranean formation into the wellbore.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

The spherical cellulose-based particulates and composites containing such particulates, as defined herein, have special applicability as lightweight particulates for use in sand control methods, such as gravel packing and frac pack treatments, as well as hydraulic fracturing. In a preferred embodiment, the particulates and composites function as a proppant.

The spherical particulate may exist solely as a porous or non-porous cellulosic material. The apparent specific gravity (ASG) of the cellulosic material is generally less than or equal to 2.4, preferably less than or equal to 2.0, even more preferably less than or equal to 1.75, most preferably less than or equal to 1.25.

Alternatively, the particulate may exist as a composite with other components, including treating agents.

The spherical particulate may be formed from a cellulose containing solution wherein the solvent is an ionic liquid. The ionic liquid is typically hydrophilic and is a salt which is liquid over a wide temperature range, including room temperature. Typically, ionic liquids are ionic in a liquid state at a temperature of below $150°$ C., more typically at a temperature of below about $100°$ C.

The ionic liquid is typically composed of an organic cation and an inorganic or organic anion. Since ionic liquids are comprised of dissociated ions, they typically demonstrate reduced vapor pressures compared with traditional organic solvents. In addition, ionic liquids may exhibit high ionic conductivity, non-volatility, non-flammability, high thermal stability, wide temperature for liquid phase, highly solvability, and be non-coordinating.

The choice of cations and anions determine the physical properties (e.g. melting point, viscosity, density, water solubility, etc.) of the ionic liquid. For example, cations can be big, bulky, and asymmetric, possibly resulting in an ionic liquid with a low melting point. As another example, anions can contribute more to the overall characteristics of the ionic liquid, such as air and water stability. The melting point for ionic liquids can be changed by structural variation of at least one of the ions or combining different ions.

The cellulose may be admixed with the hydrophilic ionic liquid in the substantial absence of water or in the substantial absence of a nitrogen-containing base. The resulting admixture may then be agitated until dissolution is complete. The admixture may then be heated, preferably by microwave irradiation. The ionic liquid is then molten at a temperature of less than about $150°$ C.

In one embodiment, cellulose may be dissolved in ionic liquids by heating it to a temperature of between from about $-10°$ C. to about $100°$ C. to form an admixture, and agitating the mixture for a time sufficient until the cellulose is dissolved. The dissolution of the cellulosic material may occur at about $100°$ C., or at or below $80°$ C., for example, in an ultrasonic bath or microwave using a domestic microwave oven. Using a microwave heater, it is preferred to heat the admixture of hydrophilic ionic liquid and cellulose to a temperature of about $100°$ C. to about $150°$ C. The dissolved cellulosic material is then precipitated from a cellulose-insoluble liquid. The spherical particulates may then be recovered. The cellulose-insoluble liquid is preferably water. The cellulose-insoluble liquid may be added to the dissolved cellulose or the dissolved cellulose may be added to the cellulose-insoluble liquid.

The cation of the ionic liquid is preferably cyclic and is most preferably an aromatic nitrogen-containing cation. Exemplary cations include:

(a.) pyridiniums, especially those of the formula (I):

(I)

(b.) pyridaziniums, especially those of the formula (II):

(II)

(c.) pyrimidiniums, especially those of the formula (III):

(III)

(d.) pyraziniums, especially those of the formula (IV):

(IV)

(e.) imidazoliums, especially those of the formula (V):

(V)

(f.) pyrazoliums, especially those of the formula (VI):

(VI)

(g.) oxazoliums, especially those of the formula (VII):

(VII)

(h.) 1,2,3-triazoliums, especially those of the formulae (VIII):

(VIII)

(i.) 1,2,4-triazoliums, especially those of the formula (IX):

(IX)

(j.) thiazoliums, especially those of the formula (X):

(X)

(k.) piperidiniums, especially those of the formula (XI):

(XI)

(l) pyrrolidiniums, especially those of the formula (XII):

(XII)

(m.) quinoliniums, especially those of the formula (XIII):

(XIII)

(n.) isoquinoliniums, especially those of the formula (XIV):

(XIV)

Further preferred are:
(o.) ammonium salts, especially those of the formula (XV):

(XV)

(p.) phosphonium salts, especially those of the formula (XVI):

(XVI)

wherein $R^1$ and $R^2$ above are independently a $C_1$-$C_{18}$, preferably a $C_1$-$C_6$, alkyl group, a $C_1$-$C_{18}$, preferably a $C_1$-$C_6$, alkoxyalkyl group and a $C_4$-$C_{18}$ aromatic group, $R^3$, $R^4$, $R^5$, $R^6$, $R^7$, $R^8$ and $R^9$ ("$R^3$-$R^9$"), when present, are independently a hydrido, a $C_1$-$C_6$ alkyl, a $C_1$-$C_6$ alkoxyalkyl group or a $C_1$-$C_6$ alkoxy group; and $R^{10}$, $R^{11}$, $R^{12}$ and $R^{13}$ are independently selected from a $C_1$-$C_{18}$ aliphatic group and a $C_4$-$C_{18}$ aromatic group. (It is preferred that all R groups not required for cation formation be hydrido.) More preferably, both $R^1$ and $R^2$ groups are $C_1$-$C_4$ alkyl, with one being methyl, and $R^3$-$R^9$, when present, are preferably independently hydrido. Exemplary $C_1$-$C_6$ alkyl groups and $C_1$-$C_4$ alkyl groups include methyl, ethyl, propyl, iso-propyl, butyl, sec-butyl, iso-butyl, pentyl, iso-pentyl, hexyl, 2-ethylbutyl, 2-methylpentyl and the like. Corresponding $C_1$-$C_6$ alkoxy groups contain the above a $C_1$-$C_6$ alkyl group bonded to an oxygen atom that is also bonded to the cation ring.

Other cations may be employed for the ionic liquid. For instance, azathiozoles, oxothiazoles, oxazines, oxazaboroles, dithiozoles, other triazoles, selenozoles, oxaphospholes, pyiroles, boroles, furans, thiophens, phospholes, pentazoles, indoles, indolines, oxazoles, isoxazoles, isotriazoles, tetrazoles, benzofurans, dibenzofurans, benzothiophenes, dibenzothiophenes, thiadiazoles, pyridines, morpholones, pyrans, annolines, phthalazines, quinazolines and quinoxalines may also be used. Alternatively, the cation may be phosphonium such as a tetraalkylphosphonium cation.

Examples of ionic liquid cations can include N-butylpyridinium and 1-alkyl-3-methylimidazolium (1,3-dialkylimidazolium; alkyl mim).

The anions of the ionic liquid are often derived from an acid, such as a Lewis acid. Preferred anions include halogen (most preferably chloride, bromide or iodide), perchlorate, a pseudohalogen ion such as thiocyanate and cyanate or a $C_1$-$C_6$ carboxylate. Suitable pseudohalides include cyanide ($CN^{-1}$), thiocyanate ($SCN^{-1}$), cyanate ($OCN^{-1}$), fulminate ($CNO^{-1}$), azide ($N_3^{-1}$) anions, alkylsulfonates including fluorinated alkyl sulfonates like nonafluorobutanesulfonate. Carboxylate anions that contain 1-6 carbon atoms ($C_1$-$C_6$ carboxylate) are illustrated by formate, acetate (including trifluoroacetate and heptafluorobutanoate), propionate, butyrate, hexanoate, maleate, fumarate, oxalate, lactate and pyruvate.

Other inorganic and organic anions may also be used. For instance, the anionic portion of the ionic liquid may miscible or immiscible in water and may include $BX_4^-$ (wherein X is halogen, preferably F), $PF_6^-$, $AsF_6^-$, $SbF_6^-$, $NO_2^-$, $NO_3^-$, $SO_4^-$, $BR_4^-$, $AlCl_4^-$, $CF_3COO^-$, $CF_3SO_3^-$, $(CF_3SO_2)_2N^-$, $CuCl_3^-$, $GaBr_4^-$, $GaCl_4^-$, $CH_3SO_4^-$, substituted or unsubstituted carboranes, substituted or unsubstituted metallocarboranes, phosphates, acetates, phosphates and polyoxometallates may be acceptable, wherein R includes hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, acyl, silyl, boryl, phosphino, amino, thio, seleno, and combinations thereof. Other anions may include triflate (TfO $CF_3SO_2^-$), nonaflate (NfOCF$_3$(CF$_2$)$_3$SO$_2^-$) bis(triflyl)amide (Tf$_2$N(CF$_3$SO$_2$)$_2$N$^-$), trifluoroacetate (TA $CF_3CO_2^-$), and nonafluorobutanoate (HBCF$_3$(CF$_2$)$_3$CO$_2^-$).

Specific examples of ionic liquids include, but are not limited to, 1-alkyl-3-methylimidazolium hexafluorophosphate (such as 1-decyl-3-methylimidazolium hexafluorophosphate, 1-butyl-3-methylimidazolium hexafluorophosphate, 1-hexyl-3-methylimidazolium hexafluorophosphate, 1-octyl-3-methylimidazolium hexafluorophosphate and 1-dodecyl-3-methylimidazolium hexafluorophosphate), 1-hexyl-3-methylimidazolium bis((trifluoromethyl)sulfonyl)amide, 1-hexylpyridinium tetrafluoroborate, 1-octylpyridinium tetrafluoroborate, 1-butyl-3-methylimidazolium tetrafluoroborate, 1-methyl-3-ethyl imidazolium chloride, 1-ethyl-3-butyl imidazolium chloride, 1-methyl-3-butyl imidazolium chloride, 1-methyl-3-butyl imidazolium bromide, 1-methyl-3-propyl imidazolium chloride, 1-methyl-3-hexyl imidazolium chloride, 1-methyl-3-octyl imidazolium chloride, 1-methyl-3-decyl imidazolium chloride, 1-methyl-3- dodecyl imidazolium chloride, 1-methyl-3-hexadecyl imidazolium chloride, 1-methyl-3-octadecyl imidazolium chloride, 1-methyl-3-octadecyl imidazolium chloride, ethyl pyridinium bromide, ethyl pyridinium chloride, ethylene pyridinium dibromide, ethylene pyridinium dichloride, butyl pyridinium chloride, benzyl pyridinium bromide, 1-ethyl-3-methyl-imidazolium-trifluoroacetate, 1-butyl-3-methylimidazolium trifluoroacetate, 1-ethyl-3-methylimidazolium trifluoroacetate, 1-ethyl-3-methylimidazolium tetrafluoroborate, 1-octyl-3-methylimidazolium bromide, 1-ethyl-3-methyl-imadazolium trifluorosulfonate, 1-butyl-3-methyl-imidazolium trifluorosulfonate, 1-butyl-3-methyl-imidazolium trifluoromethanesulfonate, and 1-ethyl-3-methyl-imidazolium trifluoromethanesulfonate, 1-ethyl-3-methylimidazolium bis(1,2-benzenediolato-O,O')borate, 1-ethyl-3-methylimidazolium bis(salicylato)borate, 1-ethyl-3-methylimidazolium bis(oxalate)borate and N-alkyl-N'-alkoxyalkylimidazoliums.

Other ionic liquids known in the art may further be employed, including those set forth in WO 2006/111712, herein incorporated by reference.

For instance, the ionic liquid may be an organic cation having secondary hydroxyl functionality on one or more atoms of the cation. For instance, the cation may have a N-(2-hydroxyalkyl) substituent. Such ionic liquids include those of the formula [R'CH(OH)CH$_2$]NR$_n$X, wherein [R'CH(OH)CH$_2$]NR$_n$ represents a cation and X represents an anion, and R' represents an alkyl group, an alkenyl group, an alkynyl group, a cycloalkyl group, an alkylcarbonyl alkyl group, an alkoxy group, a haloalkyl group, a haloalkoxy group, a alkenyloxy group, a alkynyloxy group, a cycloalkyloxy group, or an aryl group and wherein the anion, X, represents a halide; a nitrate; a borate, such as a fluoroborate or an aryl borate; an amide, such as a perfluorosulfonylimide; a sulfonate, such an alkyl sulfonate or a fluoroalkylsulfonate; a sulfate, such as an alkylsulfate; an imide, such as a fluoromethylsulfonyl imide; a phosphate, such as a fluorophosphates or a fluoroalkyl trifluorophosphate; a tosylate, an antimonite or a carboxylate. Such anion groups may include alkyl groups such as methyl, ethyl or linear or branched propyl and butyl groups.

Exemplary anions include chloride, bromide, iodide, fluoride, nitrate, triphenylborate, tetrafluoroborate, trifluoromethyltrifluoroborate, bis[oxalato(2-)]-borate, bis[salicylato(2-)]-borate, hexafluorophosphate, tris(perfluoroethyl)trifluorophosphate, tris(pentafluoroethyl)trifluorophosphate, methylsulfate, ethylsulfate, trifluoromethanesulfonate, trifluoromethylsulfonate, bis(trifyl)amide, bis(trifluoromethyl)imide, or bis(trifluoromethylsulfonyl)imide. The cation may correspond to those of formula (I) through (XIV) above provided at least one of R$^1$ and R$^2$ is [R'CH(OH)CH$_2$]. Such ionic liquids are disclosed in U.S. Patent Publication No. 2005/0065020 A1. A combination of ionic liquids may also be used.

The cellulose may further be dissolved by admixing it with a molten ionic liquid in the substantial absence of water, to form an admixture. Preferably, the ionic liquid in this methodology contains cations that contain a single five-membered ring that is free of fusion. The resulting admixture is then agitated until dissolution is complete. The admixture may then be heated as set forth herein to assist the dissolution.

In a preferred embodiment, the ionic liquid may be liquid at or below 200° C., and preferably below 150° C. and above −100° C. For instance, the ionic liquid may be liquid (molten) at or below 120° C. and above −44° C. Most preferably, the ionic liquid is liquid (molten) at −10° C. to about 100° C.

A contemplated ionic liquid and a solution prepared from such a liquid is substantially free of water or a nitrogen-containing base to form an admixture. As such, such a liquid or solution contains about one percent or less water or a nitrogen-containing base. Thus, when a solution is prepared, it is prepared by admixing the ionic liquid and cellulose in the absence of water or a nitrogen-containing base to form an admixture.

The cellulose to be dissolved can be in substantially any form that is amenable to being wet by a liquid. The cellulosic material may be porous or non-porous. Exemplary cellulose forms useful herein include cellulose as fibrous cellulose, wood pulp, linters, cotton balls and paper.

The amount of cellulose in the ionic liquid for dissolution is typically between from about 5 to about 35 weight percent of the total weight of the solution. More preferably, the cellulose is present at about 5 to about 25 weight percent of the solution. More preferably still, the cellulose is present at about 10 to about 25 weight percent of the solution.

The cellulosic particulate is typically an ultra lightweight (ULW) particulate having an ASG less than or equal to 2.45. Generally, the ASG of the ULW proppant is less than or equal to 2.25, more preferably less than or equal to 2.0, even more preferably less than or equal to 1.75, most preferably less than or equal to 1.25.

Dissolution of the cellulose in the ionic liquid may further proceed in the presence of a synthetic resin which is soluble in the ionic liquid. The resulting composite has particular applicability as a proppant for use in hydraulic fracturing.

Suitable synthetic resins include polyacrylates, poly(meth)acrylates, polyacrylamides, polyvinyl alcohol, polyvinyl acetates, polyamides, polyesters, polyimideamides, polybenzoimide, aramides, polyimides, poly(N-vinylpyrrolidinone), polyurethanes, polysiloxanes, phenolic polymers, polysulfides, polystyrenes, polyacetal, polyolefins and polydienes. Preferred resins include poly-2-hydroxymethylmethacrylate and poly-2-hydroxyethylmethacrylate.

When used, the amount of resin in the ionic liquid solution containing the cellulose is typically between from about 0.5 to about 25 weight percent of the total weight of the ionic liquid solution.

The cellulosic particulate may further be dissolved, dispersed or emulsified in the ionic liquid in the presence of one or more fillers which further serve to increase the temperature stability and strength of the resulting composite. Suitable temperature stabilizers/strengthening agents include minerals, such as finely divided minerals or finely divided minerals and/or fibers, clay, hematite, inorganic salts, kaolin, molybdenum disulfide, oil, alumina, hematite, aluminum flake, stainless steel, silicone, polytetrafluoroethylene, cement, carbon black, carbon Buckminster fullerenes, carbon nanotubes, polyhedral oligomeric silsesquioxane, metals, metallic oxides, phosphates, borates, calcium carbonate, calcium chloride, calcium bromide, barium sulfate and aluminum flakes. The amount of filler and polyamide particulate may be adjusted to tailor the composite to achieve the desirable physical properties, including particle density, bulk density, crush strength, etc. Typically, the amount of filler in the composite is between from about 1 to about 85, more typically between from about 25 to about 60, percent by volume of the composite. Filled cellulosic particulates containing such fillers render higher permeability factors than unfilled cellulosic particulates.

In another embodiment of the invention a cellulosic composite may be formed by dissolving the cellulosic material in the ionic liquid, in the manner described herein, in the presence of spherical particulate. In a preferred embodiment, the spherical particulate has an ASG greater than or equal to 2.45. The resulting composite consists of the spherical particulate having a cellulosic coating. The ASG of the cellulosic coated or treated particulate is typically lower than the ASG of the untreated particulate. Such treated spherical particulates have particular applicability as proppants wherein the spherical particulate is preferably selected from the group consisting of silica, sand, resin-coated sand, ceramic particles, synthetic organic particles, glass microspheres and sintered bauxite or a mixture thereof.

The dissolved cellulosic material may be precipitated from a cellulose-insoluble liquid. The spherical particulates may then be recovered. Suitable cellulose-insoluble liquids include water containing surfactants. Examples of surfactants include reaction products of a natural or hydrogenated castor oil and ethylene oxide. The natural or hydrogenated castor oil may be reacted with ethylene oxide in a molar ratio of from about 1:35 to about 1:60, with optional removal of the polyethyleneglycol component from the products. Various such surfactants are commercially available. The polyethyleneglycol-hydrogenated castor oils, available under the trademark CREMOPHOR, are further suitable. Particularly suitable are CREMOPHOR RH 40, which has a saponification number of about 50 to 60, an acid number less than about 1, a water content (Fischer) less than about 2%, an $n_D^{60}$ of about 1.453 to 1.457 and an HLB of about 14 to 16; and CREMOPHOR RH 60, which has a saponification number of about 40 to 50, an acid number less than about 1, an iodine number of less than about 1, a water content (Fischer) of about 4.5 to 5.5%, an $n_D^{25}$ of about 1.453 to 1.457 and an HLB of about 15 to 17. Also suitable are polyethyleneglycol castor oils such as that available under the trade name CREMOPHOR EL, which has a molecular weight (by steam osmometry) of about 1630, a saponification number of about 65 to 70, an acid number of about 2, an iodine number of about 28 to 32 and an $n_D^{25}$ of about 1.471. Similar or identical products which may also be used are available under the trademarks NIKKOL (e.g. NIKKOL HCO-40 and HCO-60), MAPEG (e.g. MAPEG CO-40h), INCROCAS (e.g. INCROCAS 40), and TAGAT (for example polyoxyethylene-glycerol-fatty acid esters e.g. TAGAT RH 40; and TAGAT TO, a polyoxyethylene-glycerol-trioleate having a HLB value of 11.3; TAGAT TO is preferred).

Further preferred as surfactants are polyoxyethylene-sorbitan-fatty acid esters, also called polysorbates, for example mono- and tri-lauryl, palmityl, stearyl and oleyl esters of the type known and commercially available under the trademark TWEEN, including the products TWEEN 20 [polyoxyethylene(20)sorbitanmonolaurate], TWEEN 21 (polyoxyethylene (4)sorbitanmonolaurate], TWEEN 40 [polyoxyethylene(20) sorbitan monopalmitate], TWEEN 60 [polyoxyethylene(20) sorbitan monostearate], TWEEN 65 [polyoxyethylene(20) sorbitan tristearate], TWEEN 80 [polyoxyethylene(20) sorbitan monooleate], TWEEN 81 [polyoxyethylene(5) sorbitan monooleate], and TWEEN 85 [polyoxyethylene(20) sorbitan trioleate].

Polyoxyethylene fatty acid esters may also be preferred as surfactants including polyoxyethylene stearic acid esters of the type known and commercially available under the trademark MYRJ. An especially preferred product of this class is MYRJ 52 having a $D^{25}$ of about 1.1, a melting point of about 40 to 44° C., an HLB value of about 16.9, an acid value of about 0 to 1 and a saponification no. of about 25 to 35.

Further preferred as surfactants are polyoxyethylene-polyoxypropylene co-polymers and block co-polymers, for example of the type known and commercially available under the trademark PLURONIC, EMKALYX and POLOXAMER. An especially preferred product of this class is PLURONIC F68, having a melting point of about 52° C. and a molecular weight of about 6800 to 8975. A further preferred product of this class is POLOXAMER 188.

Also preferred as surfactants are dioctylsulfosuccinate or di-[2-ethylhexyl]-succinate as well as phospholipids, in particular lecithins. Suitable lecithins include, in particular, soybean lecithins. Further preferred are propylene glycol mono- and di-fatty acid esters such as propylene glycol dicaprylate (also known and commercially available under the trademark MIGLYOL 840), propylene glycol dilaurate, propylene glycol hydroxystearate, propylene glycol isostearate, propylene glycol laurate, propylene glycol ricinoleate and propylene glycol stearate as well as such polyoxyethylene alkyl ethers such as those commercially available under the trademark BRIJ, e.g., BRIJ 92V, BRIJ 93 and BRIJ 35.

Tocopherol esters, e.g., tocopheryl acetate and tocopheryl acid succinate, docusate salts, e.g., dioctylsulfosuccinate or related compounds, such as di-[2-ethylhexyl]-succinate may also be used as well as a combination of any of the surfactants referenced above.

Figure 1:
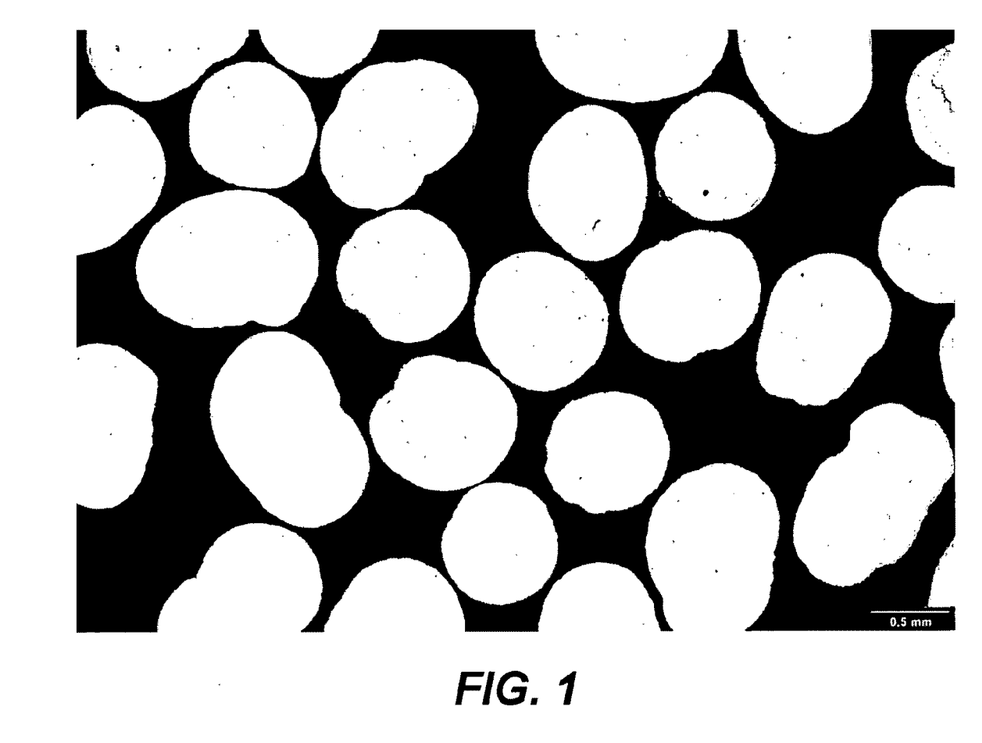
FIG. 1 represents a photo-micrograph of spherical beads, produced in accordance with the invention, wherein the beads are shown to be non-porous.

In another embodiment, the spherical cellulosic particulates may be prepared by introducing into a capillary a cellulosic material and a composition containing a buffer and an ionic liquid and then applying a voltage across the composition to form an emulsion and solidifying the emulsion droplets to form the spherical cellulosic particulates in the capillary. In various embodiments, as illustrated in FIGS. 1-5B, the present teachings can relate to methods for creating an emulsion in a capillary or channel. FIG. 1 is exemplary of this embodiment wherein reservoir 10 contains ionic liquid 12, electrode 14, capillary 16, and buffer 18. Capillary 16 can be shaped such that its ends are submerged below the surface of ionic liquid 12 in reservoir 10. Submerging the openings of capillary 16 provides a continuous ionic liquid segment from the reservoir 10 and into capillary 16 on either end of a segment of buffer 18. The term "segment" refers to a section of liquid. Electrode 14 can be a platinum wire or any other appropriate material to apply a current across the ionic liquid segments and buffer segment. In a preferred embodiment, at least two electrodes provide a voltage across the capillary channel to form the emulsion. In another embodiment, the device has a network of capillary channels and a plurality of electrodes to provide multiple emulsions. The ionic liquid segment and buffer segment can be introduced by applying vacuum, centripetal forces, active or passive capillary forces, and/or pressure.

The term "buffer" herein refers to liquids that do not mix with ionic liquids. The buffer facilitates movement of the charged species through the capillary by providing a transportation medium through which the charged species travels. Buffers can be aqueous (containing water), or they can be non-polar organic solvents such as DMF, DMSO, xylene, octane, perfluorodecalin, and other hydrocarbons that can be at least partially soluble with the cellulosic material. Buffers can be aqueous or organic because ionic liquids can be hydrophilic or hydrophobic. A voltage is then applied across the composition to form an emulsion.

Voltage is applied to the capillary or channel for a sufficient period of time for the emulsion to form. The voltage can be applied from 1 minute to 48 hours across the composition can range from 100 v to 2000 v. Depending upon the length of the capillary, the electric field strength can vary. For example, the electric field strength can range from 1 v/cm to 1000 v/cm. By varying the electric field, the cellulosic material may be transported through the ionic liquid. Moreover, once the emulsion is formed, the cellulosic material may become disassociated or separated from the emulsion droplets by increasing and/or reversing the voltage from the initial voltage used to create the emulsion.

Once the emulsion is formed, the emulsion droplets may be packed against a barrier. The cellulosic material, such as a charged species, can then be disassociated or separated from the emulsion droplets by standard techniques. For example, the spherical cellulosic particulates may be stripped from the emulsion droplets by reversing the direction of the voltage applied across the composition.

Once formed, the spherical particulates may be subjected to standard chromatography or as, for example, a filtration grid in microfluidic devices. In various embodiments, the emulsion may be formed at a first temperature, which is then decreased to a second temperature wherein the emulsion solidifies. In various embodiments, the emulsion droplets may be solidified by providing an ionic liquid having a combination of ions resulting in the solidification of the emulsion droplets.

In various embodiments, a reaction can be performed within the buffer. A reaction can result from providing reaction conditions such as temperature changes to the reactants within the buffer.

The spherical cellulosic particulates may be treated with a treating agent of a synthetic resin or a glazing material. The resin may coat all or part of the cellulosic particulate. When the cellulosic particulate is porous, the resin may penetrate into the porous matrix of the particulate, thereby entrapping or encapsulating fluid(s) within the cellulosic core matrix.

Such resins and glazing materials may be selectively employed to modify or customize the ASG of the cellulosic particulate Modification of the ASG of the cellulosic particulate may be advantageous for a number of reasons. For instance, such modification may provide proppant or sand control particulates of customized ASG which may be used as substantially neutrally buoyant particulates in a variety of different weight or ASG carrier fluids. The term "substantially neutrally buoyant" refers to a cellulosic particulate that has an apparent density sufficiently close to the apparent density of a selected ungelled or weakly gelled carrier fluid, such as an ungelled or weakly gelled completion brine, other aqueous-based fluid, slick water, or other suitable fluid, which allows pumping and satisfactory placement of the cellulosic particulate using the selected ungelled or weakly gelled carrier fluid.

In a preferred embodiment, a coating layer may be applied to the cellulosic particulate in order to provide increased particle strength and/or reduce in situ fines migration within the subterranean formation. The coating significantly increases the strength and crush resistance of the cellulosic particulate.

In a preferred embodiment, the spherical cellulosic particulate is porous and is packed such that a treating material penetrates into the pores of the particulates within the pack. The treated cellulosic particulate may consist of a multitude of coated particulates bonded together. In such manner, the porous material is a cluster of particulates coated with a coating or penetrating layer or glazing layer.

When a porous cellulosic particulate is used, the porosity and permeability characteristics of the porous cellulosic particulate allows the treating agent to be drawn at least partially into the porous matrix of the porous cellulosic particulate by capillary action, for example, in a manner similar to a sponge soaking up water. Alternatively, one or more penetrating materials, as treating agent, may be drawn at least partially into the porous matrix of the porous cellulosic particulate using a vacuum, and/or may be forced at least partially into the porous matrix under pressure.

The degree of penetration of the treating agent into the porous cellulosic particulate may be limited by disconnected porosity, such as substantially impermeable or isolated porosity, within the interior matrix of the particulate. This may either limit the extent of uniform penetration of penetrating material in a uniform manner toward the cellulosic core, such as leaving a stratified particle cross section having outside penetrating layer with unpenetrated substantially spherical core, and/or may cause uneven penetration all the way to the core, such as bypassing "islands" of disconnected porosity but penetrating all the way to the core.

In any event, a treating agent of a penetrating material or coating material may trap or encapsulate air (or another fluid having an ASG less than the cellulosic material and less than the coating or penetrating material) within the disconnected porosity in order to reduce ASG by the desired amount. As a result, the porous matrix of the treated particulate may at least be partially or completely filled with air or some other gas, i.e., the interior of the resulting particulate may include only air/gas and the structural material forming and surrounding the pores. Encapsulation of the air may provide preservation of the lightweight character of the cellulosic particles once placed in the transport fluid.

The penetrating material may be selected by balancing the need for low apparent density versus the desire for strength, i.e., a more dense material may provide much greater strength. For instance, if the resin coating or transport fluids were to significantly penetrate the porosity of the cellulosic particle, the density increases accordingly. The resin coat also adds strength and substantially enhances the proppant pack permeability at elevated stress. Thus, the penetrating material may be selected such that it helps structurally support the matrix of the porous particulate material (i.e., increases the strength of the porous matrix) and increases the ability of the cellulosic particulate to withstand the closure stresses of a hydraulic fractured formation, or other downhole stresses.

With porous cellulosic particulates, the coating or penetrating fluid is typically selected to have an ASG less than the ASG of the porous cellulosic particulate material so that once penetrated at least partially into the pores of the matrix it results in a cellulosic particulate having an ASG less than that of the porous particulate material prior to coating or penetration, i.e., filling the pore spaces of a porous particulate material results in a solid or substantially solid particle having a much reduced apparent density.

The thickness of the treating agent on the treated cellulosic particulate is generally between from about 1 to about 5 microns. The extent of penetration of the penetrating material into the porous cellulosic matrix is from less than about 0.5% penetration by volume to less than about 25% penetration by volume of the treated porous cellulosic particulate.

Examples of resins that may be employed for penetrating and/or coating the particulate include, but are not limited to, resins and/or plastics, binders or any other material. Specific examples of plastics include, but are not limited to, nylon, polyethylene, styrene, etc. and combinations thereof. Suitable resins include phenol formaldehyde resins, melamine formaldehyde resins and urethane resins. Alternatively, a cured phenolic type resin coat or other suitable cured material may be selected to contribute additional strength to the cellulosic particulates and/or reduce in situ fines migration once placed in a subterranean formation. In one exemplary embodiment, a selected coating or penetrating material may be a urethane, such as ethyl carbamate-based resin, applied in an amount of about 4% by weight of the total weight of the treated cellulosic particulate.

Typically, when the treating material is used to modify a cellulosic porous particulate, the apparent density of the treated cellulosic particulate is between from about $1.1 \text{ g/cm}^3$ to about $2.6 \text{ g/cm}^3$ and the bulk apparent density is between from about $1.03 \text{ g/cm}^3$ to about $1.5 \text{ g/cm}^3$.

Further, the cellulosic particulate material may be at least partially treated, such as, for example, surface glazing with one or more selected non-porous glaze materials. In such a case, the glaze, like the coating or penetrating material, may extend or penetrate at least partially into the cellulosic matrix (where the cellulosic particulate is porous), depending on the glazing method employed and/or the permeability characteristics of the selected porous cellulosic particulate.

Glazing may be accomplished using any suitable method for forming a glaze on the surface or in the near surface of a particle, including by incorporating a glaze-forming material into the raw material "green paste" that is then formed such as molded into shape of the particle prior to firing. Those skilled in the art recognize that glazes may be made from a variety of methods, including the application of a smooth, glassy coating such that a hard, nonporous surface is formed. Glazes may be formed from powdered glass with oxides. The mixture of powders is suspended in water and applied to the substrate. The glaze can be dried and then fixed onto the substrate by firing or similar process known to those skilled in the art. Additionally, the use of borates or similar additives may improve the glaze.

Examples of such glaze-forming materials include, but are not limited to, materials such as magnesium oxide-based material, boric acid/boric oxide-based material, etc During firing, the glaze-forming material/s "bloom" to the surface of the particles and form a glaze. Alternatively, glazing may be accomplished, for example, by applying a suitable glaze-forming material onto the surface of the formed raw material or "green" particles prior to firing such as by spraying, dipping, and similar methods so that glazing occurs during particle firing. Further alternatively, a glaze-forming material may be applied to a fired ceramic particle, and then fired again in a separate glaze-forming step. In one embodiment, the glaze forms a relatively hard and relatively non-porous surface during firing of the particles.

In a preferred embodiment, the treated particulate material may be manufactured by using a glaze-forming material to form a glaze to seal or otherwise alter the permeability of the surface of the cellulosic particulate, so that a given particle is less susceptible to invasion or saturation by a well treatment fluid and thus exhibit substantially neutrally buoyant characteristics relative to the well treatment fluid upon exposure to such fluid.

The cellulosic particulate may be treated with a coating or penetrating material using any suitable wet or dry process. Methods for coating particulates, such as fracture proppant particles, with materials such as resin are known in the art, and such materials are available, for example, from manufacturers listed herein. With regard to coating of the disclosed cellulosic particulates, coating operations may be performed using any suitable methods known in the art.

The carrier fluid which may be used in conjunction with the cellulosic particulates defined herein may be a completion or workover brine, salt water, fresh water, a liquid hydrocarbon, or a gas such as nitrogen or carbon dioxide. Examples of types of such carrier fluids include, but are not limited to, liquid $CO_2$-based systems, liquid $CO_2$, $CO_2/N_2$, and foamed $N_2$ in $CO_2$ systems that may be employed in hydraulic fracturing applications. In a specific embodiment, the cellulosic particulates are substantially neutrally buoyant in such liquefied gas and/or foamed gas carrier fluids.

The cellulosic particulates defined herein may be used in combination with one or more of gelling agents, crosslinking agents, gel breakers, surfactants, foaming agents, demulsifiers, buffers, clay stabilizers, acids or a mixture thereof.

Cellulosic particulates defined herein are particularly effective in hydraulic fracturing as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

The cellulosic particulates may be mixed and pumped during any desired portion/s of a well treatment such as hydraulic fracturing treatment or sand control treatment and may be mixed in any desired concentration with a carrier fluid. Suitable carrier fluids may be used in combination with gelling agents, crosslinking agents, gel breakers, surfactants, foaming agents, demulsifiers, buffers, clay stabilizers, acids, or mixtures thereof.

The use of the cellulosic particulates as a proppant advantageously provides for substantially improved overall system performance in stimulation procedure, such as hydraulic fracturing applications, as well as other well treating applications such as sand control. When used in hydraulic fracturing, the cellulosic particulates may be injected into a subterranean formation in conjunction with a hydraulic fracturing treatment or other treatment at pressures sufficiently high enough to cause the formation or enlargement of fractures.

Other well treating applications may be near wellbore in nature (affecting near wellbore regions) and may be directed toward improving wellbore productivity and/or controlling the production of fracture proppant or formation sand. Particular examples include gravel packing and "frac-packs." Moreover, such particles may be employed alone as a fracture proppant/sand control particulate, or in mixtures in amounts and with types of fracture proppant/sand control materials, such as conventional fracture or sand control particulate.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the cellulosic particulates and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the cellulosic particulate. In the latter case, the balance of the particulate material of the slurry may be another material, such as a conventional gravel pack particulate.

As an alternative to use of a screen, the sand control method may use the cellulosic particulate in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins is so desired.

The foregoing description of the invention is illustrative and explanatory thereof, and various changes in the size, shape, and materials, as well as in the details of the methodology may be made without departing from the spirit of the invention.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims that follow.

EXAMPLES

Particulates were prepared consistent with the procedures set forth in U.S. Patent Publication No. 2005/0288484 wherein a cellulosic material was admixed, in the substantial absence of water or a nitrogen-containing base, with an ionic liquid at a temperature between from about −10° C. to about 100° C. to form an admixture. The cellulosic material was dissolved in the ionic liquid. A cellulosic insoluble liquid was then added to the admixture and the precipitate recovered. Little, if any, swelling of the beads occurred when the beads were in the presence of water.

Physical Properties. The proppant beads were tested in light of the industry requirements for proppants. They exhibited 16/30 mesh (100%) and the properties as set forth in Table I:

TABLE I

| Proppant Requirements | Properties of Tested Beads |
|---|---|
| Sieve Analysis, >90%, API RP 56/60 | 100.00% |
| <0.1% Coarse | 0.00 |
| <1.0% Fines | 0.00 |
| Acid Solubility, 15% HCl, API RP 56/60 | +0.9 +/− 0.08% |
| Deionized water solubility[1] | +1.31 +/− 0.06% |
| Crush Resistance | No crush observed |
| Sphericity, API RP 56/60 | 0.88 |
| Roundess, API RP 56/60 | 0.88 |

TABLE I-continued

| Proppant Requirements | Properties of Tested Beads |
|---|---|
| X-ray diffraction | Amorphous |
| Bulk Density, g/cc | 0.923 +/− 0.003 |
| Apparent Density, g/cc | 1.476 +/− 0.001 |
| Absolute Density, g/cc | 1.483 |

[1]Measurement of solubility of proppant in deionized water, showing 1.31% weight gain.

Figure 2:
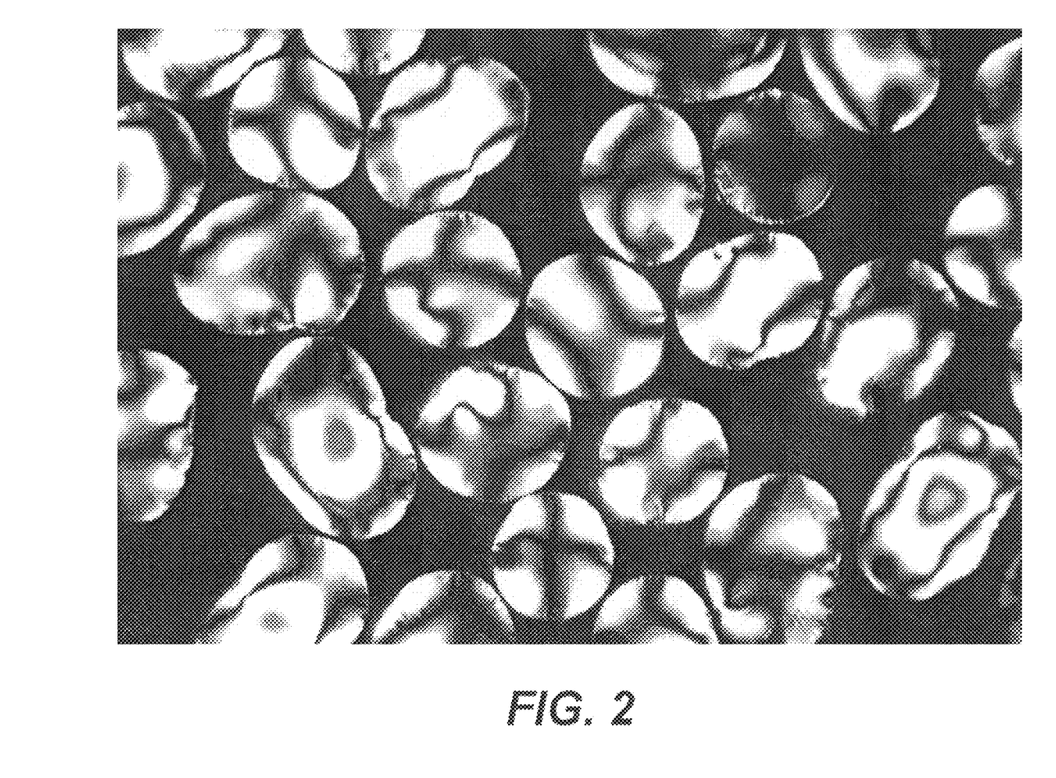
FIG. 2 represents polarized light microscopy of the beads and establishes the lack of crystallinity of the beads.

The beads for preparation of the thin section microscopy testing were placed into an epoxy resin and the resulting block was cross-sectioned. FIG. 1, shows the produced beads to be non-porous and establishes the lack of surface porosity. FIG. 1 further shows the dense interior of the beads. FIG. 2 shows the beads under polarized light microscopy. While some beads illustrate a small portion of crystallinity, the majority of the beads are amorphous and no crystallinity. FIG. 2 establishes the temperature stability of the beads at high temperatures.

Tests were further tested (in triplicate) under different API RP methods for proppant in hydraulic fracturing (API RP 56) and gravel packing (API RP 58) using mud acid (12:3) (wt/wt), typically used to clean and/or remove fines from the well being treated. The results (averaged), summarized in Table II, show a weight gain of the beads under these test conditions:

TABLE II

| Procedure | Solution | Time, min. | Temp., ° F. | Results, Δ mass | Stand. Dev. |
|---|---|---|---|---|---|
| API RP 58 | Sand in gravel packing, 12% HCl/3% HF | 60 | Room temp. | (+) 0.213% | 0.08 |
| API RP 56 | Sand in hydraulic fracturing 12% HCl/3% HF | 30 | 150 | (+) 0.651% | 0.02 |
| $H_2O^2$, API RP 56 | $H_2O$ | 30 | 150 | (−) 0.234% | 0.10 |

[2]Water testing not part of the API RP 56; little weight loss when conducted in water.

Conductivity/Permeability. Using approximately 31.5 grams of the spherical beads having a proppant pack width shown in Table III, conductivity tests were performed at 150° F. according to ISO 13503-5 (Procedures for Measuring the long term conductivity of Proppants) but using an API conductivity cell with Ohio sandstone wafer side inserts to simulate the producing formation. The test proppant was placed between the sealed sandstone wafers. The conductivity cell was then placed on a press while stress was applied at 100 psi/minute at room temperature until the target temperature was reached. Fluid was then allowed to flow through the test pack maintaining Darcy flow. The differential pressure was measured across 5 inches of the pack using a "ROSEMOUNT" differential pressure transducer (#3051C). Flow was measured using Micromotion mass flow meters and data points were recorded every 2 minutes for 50 hours. An Isco 260D programmable pump applied and maintained effective closure pressure.

The beads reported in Tables I and II were used (Sample 1) as well as three other samples. The permeability and conductivity data where the fluid flowing through the test pack was water is set forth in Table III below. The concentration of the spherical beads in these tests was 1 lb/ft$^2$.

TABLE III

| TIME hrs | STRESS psi | WIDTH (mm) | | | | CONDUCTIVITY (mDft) | | | | PERMEABILITY (D) | | | |
|---|---|---|---|---|---|---|---|---|---|---|---|---|---|
| | | Sample 1 | Sample 2 | Sample 3 | Sample 4 | Sample 1 | Sample 2 | Sample 3 | Sample 4 | Sample 1 | Sample 2 | Sample 3 | Sample 4 |
| 0 | 1000/RT | 5.23 | 5.13 | 5.31 | 5.34 | 7243 | 8226 | 7000 | 7445 | 422 | 488 | 402 | 425 |
| 0 | 1000 | 5.27 | 5.17 | 5.37 | 5.46 | 5669 | 4958 | 5304 | 5162 | 328 | 292 | 301 | 288 |
| 100 | 1000 | 5.25 | 4.94 | 5.34 | 5.42 | 2073 | 1709 | 1910 | 2499 | 120 | 105 | 109 | 141 |
| 0 | 3000 | 4.69 | 4.34 | 4.83 | 5.07 | 562 | 348 | 627 | 1293 | 37 | 24 | 40 | 78 |
| 50 | 3000 | 4.53 | 4.11 | 4.59 | 4.79 | 300 | 106 | 260 | 568 | 20 | 8 | 17 | 36 |
| 0 | 5000 | 4.16 | 3.82 | 4.39 | 4.60 | 78 | 33 | 144 | 332 | 6 | 3 | 10 | 22 |
| 50 | 5000 | 4.04 | 3.65 | 4.17 | 4.32 | 29 | 10 | 35 | 15 | 2 | 1 | 3 | 1 |

Table III establishes that even at long term, the conductivity and permeability of the spherical beads is high.

Sample 4 was then tested in oil as the fluid which flows through the test pack to simulate a well containing only oil. The results are set forth in Table V

TABLE V

| | | Water at 150° F. | | | | | ISOPAR AT 150° F. | | |
|---|---|---|---|---|---|---|---|---|---|
| Time Hrs | Stress psi | WIDTH mm | COND mDft | PERM D | TIME hrs | STRESS psi | WIDTH mm | COND mDft | PERM D |
| 0 | 1000/RT | 5.34 | 7445 | 425 | 0 | 1000/RT | 5.19 | 7280 | 428 |
| 0 | 1000 | 5.46 | 5162 | 288 | 0 | 1000 | 5.29 | 7168 | 413 |
| 100 | 1000 | 5.42 | 2499 | 141 | 50 | 1000 | 5.17 | 6527 | 385 |
| 0 | 3000 | 5.07 | 1293 | 78 | 50 | 2000 | 4.95 | 5032 | 310 |
| 50 | 3000 | 4.79 | 568 | 36 | 50 | 3000 | 4.84 | 4037 | 254 |
| 0 | 5000 | 4.60 | 332 | 22 | 50 | 4000 | 4.67 | 3263 | 213 |
| 50 | 5000 | 4.32 | 15 | 1 | 50 | 5000 | 4.51 | 2603 | 176 |

Table V establishes that even at 5,000 psi, conductivity and permeability is high.

From the foregoing, it will be observed that numerous variations and modifications may be effected without departing from the true spirit and scope of the novel concepts of the invention.

What is claimed is:

1. A method of stimulating production of hydrocarbons in an oil or gas well by creating a fracture in a subterranean formation, the method comprising injecting into the subterranean formation a proppant comprising a particulate of a spherical porous or non-porous cellulosic material, wherein the spherical porous or non-porous cellulosic material provides the requisite crush resistance to the proppant in order for the proppant to hold the created fracture open while hydrocarbons are produced from the formation and further wherein the proppant is prepared by:
   (a) admixing the cellulosic material, in the substantial absence of water or a nitrogen-containing base, with an ionic liquid at a temperature between from about −10° C. to about 100° C. to form an admixture, and agitating the mixture for a time sufficient until the cellulosic material is dissolved;
   (b) forming a precipitate from the product of step (a) and a cellulose-insoluble liquid;
   (c) recovering a particulate of spherical cellulosic material from the precipitate of step (b); and
   (d) drying the recovered spherical particulate containing cellulosic material.

2. The method of claim 1, wherein the cellulosic material is selected from the group consisting of fibrous cellulose, wood pulp linters, cotton balls and paper.

3. The method of claim 1, wherein the proppant is injected into the subterranean formation at a concentration sufficient to achieve a partial monolayer fracture.

4. The method of claim 1, wherein at least a portion of the surface of the cellulosic material is treated with a coating or penetrating layer.

5. The method of claim 4, wherein the cellulosic material is porous.

6. The method of claim 4, wherein the apparent specific gravity of the treated cellulosic material is less then the apparent specific gravity of the untreated cellulosic material.

7. The method of claim 4, wherein the cellulosic material has an apparent specific gravity less than or equal to 2.45 and further wherein the apparent specific gravity of the treated cellulosic material is lower than the apparent specific gravity of the cellulosic material.

8. The method of claim 1, wherein the proppant is prepared from an admixture of the cellulosic material and a synthetic resin soluble in the ionic liquid.

9. The method of claim 8, wherein the synthetic resin is selected from the group consisting of polyacrylates, poly(meth)acrylates, polyacrylamides, polyvinyl alcohol, polyvinyl acetates, polyamides, polyesters, polyimideamides, polybenzoimide, aramides, polyimides, poly(N-vinylpyrrolidinone), polyurethanes, polysiloxanes, phenolic polymers, polysulfides, polystyrenes, polyacetal, polyolefins and polydienes.

10. The method of claim 9, wherein the synthetic resin is selected from the group consisting of poly-2-hydroxymethylmethacrylate and poly-2-hydroxyethylmethacrylate.

11. The method of claim 1, wherein the proppant comprises a composite of the particulate and at least one temperature stabilizer and/or strengthening agent.

12. The method of claim 11, wherein the at least one temperature stabilizer and/or strengthening agent is selected from the group consisting of minerals, clay, hematite, inorganic salts, kaolin, molybdenum disulfide, oil, alumina, hematite, aluminum flake, stainless steel, silicone, polytetrafluoroethylene, carbon black, carbon Buckminster fullerenes, carbon nano-tubes, polyhedral oligomeric silsesquioxane, metals metallic oxides, phosphates, borates, calcium carbonate, calcium chloride, calcium bromide, barium sulfate and aluminum flakes.

13. The method of claim 1, wherein the cellulose-insoluble liquid of step (b) is water.

14. The method of claim 1, wherein in step (b) a cellulose-insoluble liquid is introduced to the product of step (a) to render the precipitate.

15. The method of claim 1, wherein in step (b) the product of step (a) is introduced into a cellulose-insoluble liquid to render the precipitate.

16. The method of claim 1, wherein the proppant consists essentially of a spherical porous or non-porous cellulosic particulate.

17. A sand control method for a wellbore penetrating a subterranean formation, comprising introducing into the wellbore either:
 (a) a slurry comprising particulates and a carrier fluid, wherein the particulates are a spherical porous or non-porous cellulosic material, the spherical porous or non-porous cellulosic material being capable of reducing or substantially preventing the passage of formation particles from the formation into the wellbore; or
 (b) a slurry comprising a particulate and a carrier fluid, wherein the particulate has an apparent specific gravity greater than or equal to 2.45, wherein at least a portion of the particulate is coated or treated with a cellulosic material, the apparent specific gravity of the coated or treated particulate being lower than the apparent specific gravity of the particulate; and
 placing at least a portion of the particulate(s) adjacent to the subterranean formation to form a fluid-permeable pack capable of reducing or substantially preventing the passage of formation particles from the subterranean formation into the wellbore while allowing passage of formation fluids from the subterranean formation into the wellbore wherein the particulate(s) are prepared by:
 (i) admixing the cellulosic material, in the substantial absence of water or a nitrogen-containing base, with an ionic liquid at a temperature between from about −10° C. to about 100° C. to form an admixture, and agitating the mixture for a time sufficient until the cellulosic material is dissolved;
 (ii) forming a precipitate from the product of step (i) and a cellulose-insoluble liquid;
 (iii) recovering particulate(s) of spherical cellulosic material from the precipitate of step (ii); and
 (iv) drying the recovered spherical particulate(s) containing cellulosic material.

18. The method of claim 17, wherein at least a portion of the surface of the cellulosic material of (a) has been treated with a coating or penetrating layer.

19. The method of claim 17, wherein the particulate(s) of (a) or (b) forms a composite, the composite further comprising at least one temperature stabilizer and/or strengthening agent.

20. The method of claim 17, wherein the cellulose-insoluble liquid of step (ii) is water.

21. The method of claim 17, wherein in step (ii) a cellulose-insoluble liquid is introduced to the product of step (i) to render the precipitate.

22. The method of claim 17, wherein in step (ii) the product of step (i) is introduced into a cellulose-insoluble liquid to render the precipitate.

23. The method of claim 17, wherein the particulate(s) consist essentially of spherical porous or non-porous cellulosic particulate(s).

* * * * *